June 23, 1931.
S. VERNET
CAR HEATER
Re. 18,110
Original Filed June 21, 1927
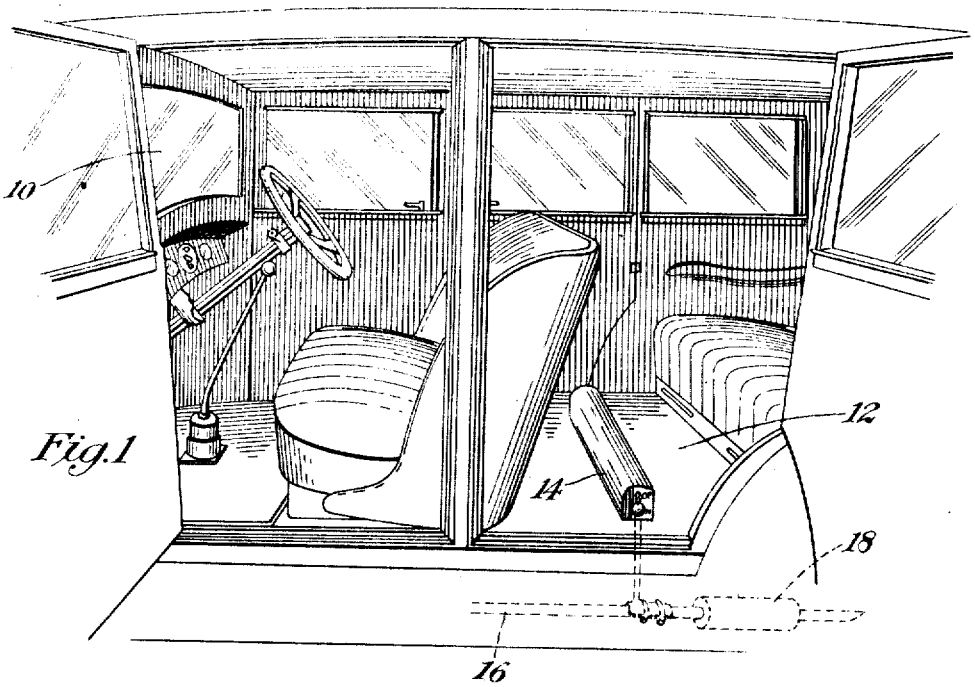
Fig.1
Fig.2
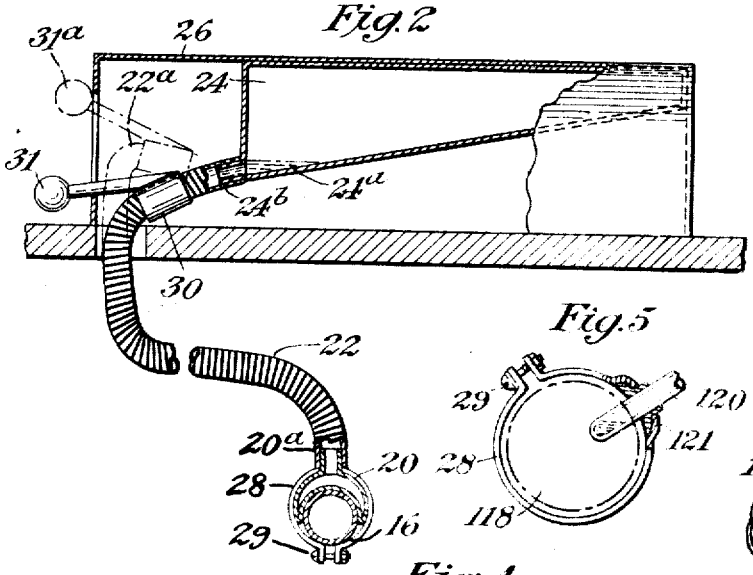
Fig.3
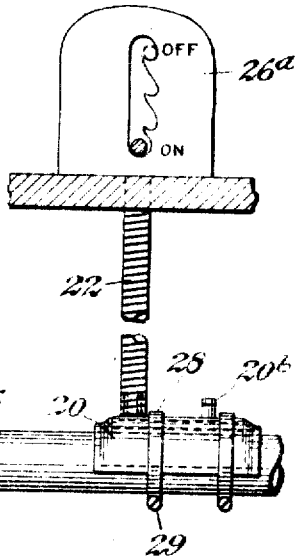
Fig.5
Fig.4
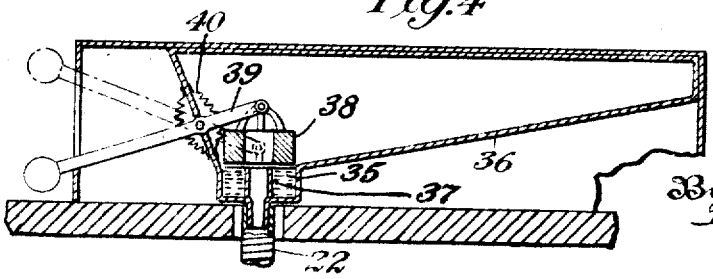
Inventor,
Sergius Vernet.
By
Andrew Wilson.
His Attorney Reissued June 23, 1931

Re. 18,110

UNITED STATES PATENT OFFICE

SERGIUS VERNET, OF BROOKLYN, NEW YORK

CAR HEATER

Original No. 1,705,550, dated March 19, 1929, Serial No. 200,328, filed June 21, 1927. Reissue No. 17,431, dated September 10, 1929, Serial No. 380,738, filed July 24, 1929. This application for reissue filed July 17, 1930. Serial No. 468,718.

This invention relates to an improvement in heaters for automobiles, buses, trucks and other vehicles operated by internal combustion engines. More particularly, this invention relates to a heater which is operated by the heat of the exhaust gases of the internal combustion engine, the source of the heat, namely, the exhaust gases, being non-uniform, and the rate at which heat is transferred to warm up a compartment of the vehicle is properly regulated.

Various means for heating the interior of automobiles, buses, trucks and other vehicles operated by internal combustion engines from the exhaust heat of the engine have been devised. In some of these heaters the exhaust gases are conducted directly through heating devices in the passenger compartments, in others a by-pass receiving a portion of the exhaust gases and conducting them through a suitable radiator has been used.

In general these heaters are subject to serious difficulty, because they sometimes become overheated to the extent that the dirt and dust which is collected around them is burned and gives off an unpleasant odor. Leaks also occur admitting carbon monoxide into the passenger compartment. Metal pans have to be furnished with these heaters so that when they are installed they are kept away from any water or combustible material. Their installation is difficult in so far as the exhaust pipe has to be cut and connections made from it to the heater. They also increase the back pressure in the exhaust pipe which in turn affects the efficiency of the engine.

The valves in this type of heater, being directly in the passage of the exhaust gases, become oxidized and also covered with carbon to the extent that they often cease functioning making it impossible to turn the heater on and off.

The type of heater which uses hot air heated by the exhaust pipe and then led into the passenger compartment is subject to the difficulty that all the objectionable odors around the exhaust pipe and the engine are conveyed with the hot air into the vehicle, as well as a lot of road dust and dirt.

A further difficulty encountered in connection with all of these heaters which use the exhaust gases of the engine as a source of heat lies in the wide range in the amount of heat to be found in the exhaust gases. All of such heaters as heretofore devised have been non-uniform in their operation in that a substantial increase in the amount of heat in the exhaust gases results in over-heating of the compartment of the vehicle.

It is the principal object of this invention to provide a motor vehicle heater which will obviate the above disadvantages and to devise an improved heating system for a compartment of a motor vehicle whereby the same may be satisfactorily and efficiently heated, and the transfer of heat automatically regulated to cause such transfer to be uniform.

It is a further object of this invention to provide an automobile heater, including as the heating medium a vapor condenser system suitably connected with the exhaust pipe to receive heat of vaporization therefrom, and to conduct the vapor to a condenser radiator where the vapor gives up its heat and is condensed and returned to be revaporized by the exhaust heat, such circulation being free of metering as by valves or the like.

A further object of my invention is to regulate the amount of heat liberated within the vehicle compartment by withdrawing varying amounts of fluid from active circulation in the heating system, but otherwise not restricting the return of condensate for revaporization.

Further objects and advantages of this invention will appear from the following detailed description of the attached drawings which illustrate a preferred form of embodiment of my invention and in which:

Fig. 1 is a diagrammatic view of a closed car body showing the location of my improved heater therein.

Fig. 2 is a side elevation partly in section showing a construction of the heater.

Fig. 3 is an end view of the heater shown in Fig. 2 illustrating the connection between the heater and the exhaust pipe, as well as the control valve.

Fig. 4 is a side elevation partly in section similar to Fig. 2 showing a modified form of control means.

Fig. 5 is an end view of a further modified form of vapor generator or reservoir.

The automobile 10 shown diagrammatically in Fig. 1, is a typical enclosed private automobile and has the rear compartment 12 in which a heater 14 constructed according to an adaptation of my invention is located and is supplied with heat from the exhaust pipe 16 shown in dotted lines between the engine (not shown) and the muffler 18.

It is obvious that this heater might be placed in either an open or a closed car and may be placed in either the front or the rear compartment thereof, or may be used on buses, trucks and other automotive vehicles as desired.

In the specific form of the invention illustrated, the heater comprises a hollow shoe or vapor generator 20 to be attached over the exhaust pipe. This vapor generator is preferably made of a thin metal which may be made to conform to the shape of the exhaust pipe by means of bands 28 suitably fastened by nuts and bolts 29. It is obvious that the amount of exhaust gases and the temperature of the same varies substantially from time to time in accordance with whether the motor has become warmed up, and the speed at which the vehicle is being driven. The shoe 20 is made hollow to enclose a small portion of the heating liquid, and for the average passenger automobile need hold only approximately five tablespoons of the liquid.

The shoe 20 is connected into a closed system for heating the rear compartment 12. This closed system comprises not only the shoe 20 but also a radiator condenser 24, a flexible hose or conduit 22 and means for holding a portion of the heating fluid out of active circulation. This means is hereinafter termed "means for trapping fluid", and the term "trapping means" is to be understood as including broadly any construction or arrangement designed to withdraw fluid from active circulation without actually draining the same out of the system. This trapping means is adjustable as will later be shown to vary the amount of fluid actively in circulation. This adjustable means, together with the vapor generator 20, is enclosed in a suitable frame 26. The flexible connection 22 is secured by a fluid tight connection to an upstanding nipple on the heater shoe 20, and is adapted to conduct the fluid vapor from the vapor generator 20 to the radiator condenser 24. The radiator condenser 24 is preferably a stamped vapor-proof metal tank. The trapping means for holding a portion of the heating fluid out of active circulation is associated with the radiator condenser 24; and in the embodiment disclosed herein is in part formed integrally therewith, taking the form of a sump or similar drain portion 24, and an outwardly projecting nipple $24^b$. To the outer end of the nipple $24^b$ is connected the upper end of the vapor conduit 22. It is clear from the drawings that the radiator condenser 24 is in free communication at all times with the vapor generator 20. The vapor given off from the heated liquid in the vapor generator 20 or otherwise produced finds its way into the condenser 24 and there gives up its heat, changing into liquid form. The return of this condensate through the conduit 22 is not interfered with. It is desirable, however, to control the amount of heat given off by the radiator 24. I provide means for so controlling my heating system; and the means which I provide do not throttle or restrict the passage by which condensate returns to the vapor generator; but instead, I form a pool or reserve of liquid, thereby controlling the amount of fluid actively in circulation. The regulating means includes an enclosing sleeve 30 with an extended projecting handle 31, the sleeve being placed over the conduit 22 near the sump or drain of the radiator condenser 24. As will be understood this sleeve 30 of the regulating means merely encloses the conduit 22 and is adapted to raise the conduit to the dotted position as shown in Fig. 2 at $22^a$, the handle being raised to the position $31^a$ when it is desired to shut off the heater. The metallic housing 26 for the heater provides a neat and attractive external appearance and aids in conducting the heat from the condenser as well as to support and protect the condenser on the car floor. The regulating means 31 comprises an enlarged ball or handle which cooperates with the serrated opening on the end $26^a$ of the heater as shown in Fig. 3. Suitable markings on the end adjacent the extreme positions will indicate by inspection, when the heater is on or off.

The operation of this device is as follows:

A suitable fluid such as water or alcohol, carbon tetrachloride, or the like, or any combination of fluids, having a boiling point between 150 and 212 degrees F., is placed in the shoe or reservoir 20 through the filling cap $20^b$ using a limited amount, as before mentioned. The condenser and reservoir are then hermetically sealed preferably under a slight vacuum and the shoe is placed on the exhaust pipe. Under operation of the motor, the exhaust gas will sufficiently heat the liquid to vaporize it, and the vapor will rise to the condenser 24 and will give sufficient heat from the condenser to warm the interior of the vehicle. The vaporized fluid is cooled by this exchange of heat and condensed, and will return through the conduit 22 to the reservoir 20 and in turn will again be heated, vaporized, give off its heat in the condenser, and return to the reservoir, thus maintaining a continual circulation and effectively warming the car.

The normal operation of my improved device contemplates this continual circulation of the fluid. It is desirable, however to control the amount of heat given off by the radiator condenser 24 as the car compartment may at times become too warm if the full effectiveness of the heating system is used at all times. To control the heat given off by the radiator condenser, the operator merely grasps the control handle 31 and moves it from the on position to an adjusted position between the on position and the off position, or to the off position itself. If the handle 31 be moved to the off position, the condensed liquid will be unable to return over the high point 22ª in the conduit, and thus since none of the condensate is returned to the shoe 20, further vaporization will stop and no more heat will be given off.

When the control handle 31 is moved to a position between the on and the off position, an amount of liquid is accumulated or trapped, depending upon the position of the handle 31. This liquid is, in effect, withdrawn from circulation. It will be clear from the above disclosure of the operation of the apparatus that if the amount of fluid which is trapped is large, the amount of fluid actively in circulation will be small and the volume of fluid returned to the vapor generator for reheating during a given period of time will be smaller than in the case where a smaller amount is trapped. If the amount trapped be decreased, the rate at which fluid is returned for reheating by the exhaust gases is correspondingly increased. This operation takes place automatically without the use of a valve or restricting device for interfering with the return of fluid to the vapor generator for reheating.

In a heater of this type, where the rate of heat supply is variable, it is important that the condensate be fed to the vapor generator at a rate which corresponds to the rate at which heat is given off by the radiator-condenser. It is not feasible to control the rate of fluid return by a metering valve, as such devices do not function accurately enough when handling such small quantities of liquid. By my apparatus, the desired metering effect is obtained without valves and the amount of heating is regulated, by varying the quantity of liquid in active circulation. As soon as a drop of liquid flows back to the vaporizer it is turned into steam. The vaporizer acts as a flash boiler and during normal operation, will contain no liquid. Hence, variations in the quantity of heat supplied by the engine have no effect.

No serious effects will take place because of continued heating up to the point where no liquid remains in the vapor generator 20, inasmuch as the quantity of liquid in the entire heating system is so small that it might all be vaporized and the vapor will only be superheated and the superheat pressure of the vapor will not cause rupture of the metallic condenser shell or unduly increase the temperature. By using a liquid having a suitable vaporization point, the heater becomes quickly heated when the engine has started and continues to give off heat until all the vapor is condensed.

A modified form of control means to shut off the heater is shown in Fig. 4 in which a sump portion 35 in the condenser 36 is so enlarged as to receive all the condensed fluid to be used in the system. An upwardly projecting pipe 37 which is an extension of the nipple to which the conduit 22 is connected prevents the fluid when condensed from returning to the shoe 20. A cork or metallic collar 38 attached to the handle 39 is adapted to entirely fill the sump portion and when in its lower position will permit the condensed fluid to return through the nipple to the shoe 20. It will be understood that the heater shoe is connected in the same way to the end of the conduit 22 and that similarly arranged latch means as shown in Fig. 3 will cooperate with the operating handle 39. To shut off this form of heater, the handle 39 is lowered, elevating the collar 38 and permitting all the liquid to remain in the sump 35 so that no further vaporization can take place. The handle 39 may be arranged in various positions intermediate full "off" and full "on" position. The amount of liquid displaced by the cork or collar 38 is correspondingly graduated. It is evident, therefore, that in this embodiment, as in the one shown in Fig. 2, the amount of fluid actively in circulation may be controlled. It should, furthermore, be noted that it is not an essential of the invention that the fluid or sump be within the radiator condenser; inasmuch as the fluid may be withdrawn by trapping the same in a container connected at any point with the closed system. In this embodiment a flexible diaphragm 40 of suitable material, such as a metallic bellows makes an air-tight joint around the handle 39.

A modified form of vapor generator or reservoir 120 is shown in Fig. 5 which is adapted to be used in conjunction with the exhaust muffler 118. The muffler gases are several hundred degrees hotter than the outside of the exhaust pipe and for this reason, the element 120 may be made somewhat smaller and yet be equally effective. It will be similarly held in place by a suitable clamp 28, fastened by a securing means 29 and is adapted to retain packing 121 to securely close the opening made in the muffler 118 and to prevent rattles.

In operation this form vaporizes the liquid much quicker than the other because of the increased heat. There will also be no lagging required to retain the heat and all that will be required to adapt it to a muffler will be to drill a suitable hole therein.

From the above detailed description, it is seen that a very simple and yet highly effective car heater is provided in which the heat can be quickly and adequately transferred from the source, the exhaust pipe, to the heat radiator in the car body, and because of the superheating of the fluid, increased temperature may be obtained without rupture of the parts. When less heat is desired, operation of the control means will either shut the device off entirely or it may be so adjusted as to cause a desired quantity of fluid to be withdrawn from active circulation, thereby automatically governing the rate at which fluid is returned for reheating by the exhaust gases. Such control of the amount of fluid trapped regulates the heat given off by the radiator condenser. When the device is warmed and the motor turned off, by merely closing the heater off, the retained fluid will retain its heat temporarily. In such a device disclosed, there can be no objectionable odors because there is no source of excessive heat and the heater is sealed to retain all of the vapors.

While I have shown a preferred form of embodiment of the device, I am aware that other modifications might be constructed and I, therefore, desire protection on the broad scope of the invention as described herein and as claimed in the claims appended hereto.

I claim:

1. A vapor pressure heating system for a vehicle having an engine, comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, and means for trapping varying amounts of fluid to vary the quantity of fluid actively in circulation, the return of condensate to the generator being modified by said means only when the amount of trapped fluid is being changed.

2. A vapor pressure heating system for a vehicle driven by an internal combustion engine comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, and means for trapping a pool of condensate, said trapping means communicating with the heating system only at or above the surface of the pool.

3. A vapor pressure heating system for a vehicle driven by an internal combustion engine comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, means for trapping a pool of condensate, said trapping means communicating with the circulating system only at or above the surface of the pool, and means for controlling the amount of condensate in the pool.

4. A vapor pressure heating system for a vehicle driven by an internal combustion engine comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, and adjustable means for trapping condensate to form a reserve pool, the discharge of condensate from the pool, except when adjustment is taking place, being only by inflow of further condensate to displace the condensate thus discharged.

5. In a vapor heater for motor vehicles, a sealed vapor condenser system comprising means to vaporize a liquid, means to condense said vapor, a continuously open vapor and condensate conductor connecting the vaporizing means and the condensing means, and means for trapping condensed vapor to control the amount of vapor formed, said trapping means holding such condensate without interiorly obstructing the conducting means.

6. In a vapor heater for motor car bodies, a vaporizing chamber containing a liquid, unitary, common means to conduct vapor to the car body and to return condensate to the vaporizing chamber, condenser means to condense said vapor and warm the car body, means for trapping condensed vapor within the condenser to regulate the heat conveyed said means trapping the condensate without interiorly obstructing the conducting means, and means operable from outside said condenser for controlling the trapping means.

7. A vapor pressure heating system for a vehicle having an internal combustion engine, comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, and means for storing a pool of condensate, said means communicating with the circulating system only at or above the surface of the pool and having its effective capacity variable.

8. A vapor pressure heating system for a vehicle driven by an internal combustion engine, comprising a vapor generator for absorbing heat from the exhaust gases of the engine, a condenser radiator, conducting means operatively connecting the generator and the radiator for the flow of vaporized fluid from the generator to the radiator and the re urn of condensate from the radiator to the generator, and control means for withdrawing a portion of the condensate from circulation while leaving the normal circulation of the remaining fluid or generated vapor unimpeded, thereby controlling the rate of heat transfer by reducing or limiting the amount of vapor generation.

9. A vapor heating system for a vehicle driven by an internal combustion engine, comprising a vapor generator for absorbing heat from the exhaust gases of the engine, a condenser radiator, a vaporizable fluid in the system, conducting means operatively connecting the generator and the radiator for the flow of vaporized fluid from the generator to the radiator and the return of condensate from the radiator to the generator, and means for trapping a desired amount of condensate in the condenser radiator, said means being adjustable so as to intercept substantially the entire return flow of the condensate to the vapor generator while leaving the flow of vapor from the generator to the condenser substantially unimpeded, the conducting means between the generator and the condenser including a conduit for the flow of vapor, said conduit projecting a sufficient distance upwardly within the condenser radiator so that its end lies above the surface of the trapped condensate when the entire amount of fluid in the system has been trapped.

10. A vapor pressure heating system for a vehicle having an internal combustion engine, comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, means for storing a reserve pool of condensate, and an adjustable displacement device for varying the effective capacity of the storing means.

11. A vapor pressure heating system for a vehicle driven by an internal combustion engine comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, and means for damming the return flow of condensate to the vapor generator, said damming means being adjustable in height to trap varying amounts of condensate.

12. A vapor pressure heating system for a vehicle having an engine and an exhaust conduit leading from the engine, comprising a heating chamber adapted to be heated by the exhaust gases passing through the exhaust conduit, a condenser radiator located in the compartment to be heated, a single exteriorly closed and interiorly uncontrolled conduit between the heating chamber and the radiator, a volatile liquid in said heating chamber adapted to be vaporized by the heat of the exhaust, and to be condensed in the radiator to give off its heat and return to the heating chamber for revaporization, and means to control the heater by preventing the return of liquid to the heating chamber.

13. A vapor heating system for automobiles, comprising a vapor generator, a condenser radiator, a single interiorly uncontrolled conduit to conduct the vapor from the generator to the radiator and to conduct condensate from the radiator to the generator, and means to prevent return of the condensate to the generator, said system being sealed to prevent the escape of vapor therefrom.

14. A heater for automotive vehicles comprising a means to vaporize a liquid, means to conduct the vapor to the passenger compartment of the vehicle, means to warm the passenger compartment, comprising a condenser receiving said vapor, said conducting means being continuously open interiorly and acting to return the condensed liquid from the condenser to the vaporizing means, and adjustable means to prevent the return of condensed liquid.

15. In a heater for a vehicle driven by an internal combustion engine having an exhaust pipe, the combination with the exhaust pipe of the engine, of a heater shoe adapted to be heated by said exhaust pipe when said engine is operated, a liquid in said shoe to be vaporized by said heat and means in the automobile body to receive and condense said vapor, a conduit continuously open interiorly to conduct the vapor to the condensing means and to return said liquid to be again revaporized for the purpose of heating the body, and adjustable means to prevent return of said fluid without obstructing said conduit for the purpose of controlling the heater.

16. In a heater for automotive vehicles, propelled by an internal combustion engine, means to convey heat from the exhaust gas comprising a vaporizer, a liquid whose boiling point is substantially equal to or lower than that of water, common means continuously open interiorly to convey the vapor from the vaporizer to the vehicle body and to return the condensed liquid to the vaporizer, means in the vehicle body to receive and condense said vapor and heat the vehicle body, and control means preventing the return of the condensed liquid to the vaporizer without interiorly obstructing the liquid returning means, thereby preventing transfer of heat to the vehicle body.

17. A vapor pressure heating system for a vehicle having an internal combustion engine, comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, and means for storing a pool of condensate, said means communicating with the heating system only at or above the surface of the pool and having its effective capacity variable, the maximum effective capacity being sufficient to store substantially all the condensate in the heating system and withdraw said condensate from circulation.

18. A vapor pressure heating system for a vehicle having an internal combustion engine, comprising a vapor generator for absorbing heat from the exhaust gases of the engine, a condenser radiator, conducting means operatively connecting the generator and the radiator for the flow of vaporized fluid from the generator to the radiator and the return of condensate from the radiator to the generator, means for damming the return flow of condensate to the vapor generator to store a pool of condensate, said damming means permitting flow only over the same, and an adjustable displacement device for varying the quantity of condensate stored in the pool.

SERGIUS VERNET.

CERTIFICATE OF CORRECTION.

Reissue Patent No. 18,110. Granted June 23, 1931, to

SERGIUS VERNET,

It is hereby certified that error appears in the printed specification of the above numbered patent requiring correction as follows: Page 5, line 49, claim 10, strike out the word "reserve"; and that the said Letters Patent should be read with this correction therein that the same may conform to the record of the case in the Patent Office.

Signed and sealed this 18th day of August, A. D. 1931.

(Seal)

M. J. Moore,
Acting Commissioner of Patents.